May 9, 1939.  F. J. DE JAVANNES  2,157,282
DISPENSER
Filed Jan. 26, 1938
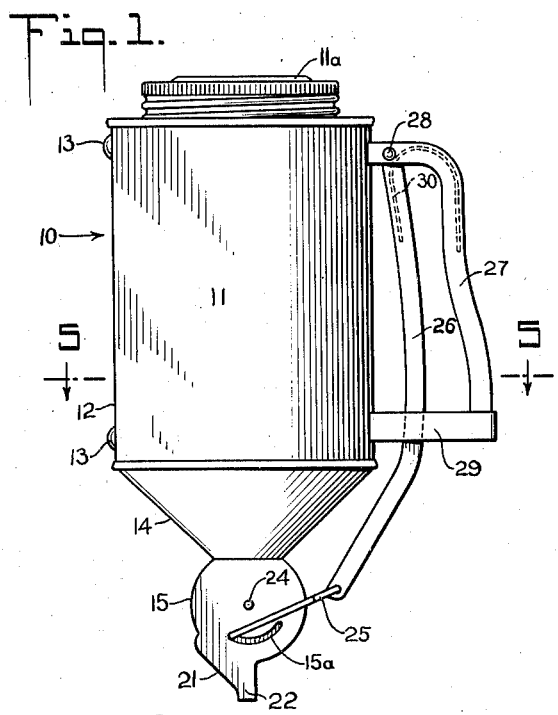
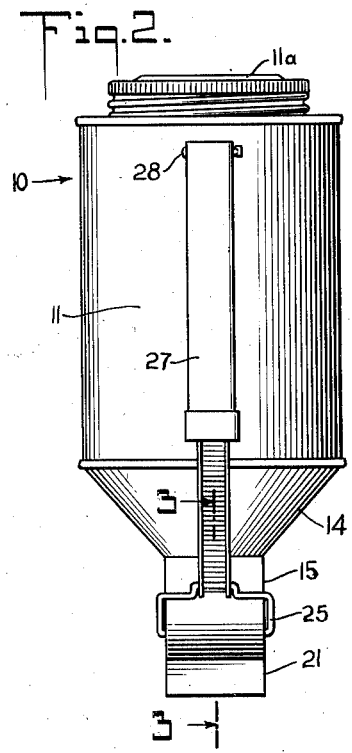
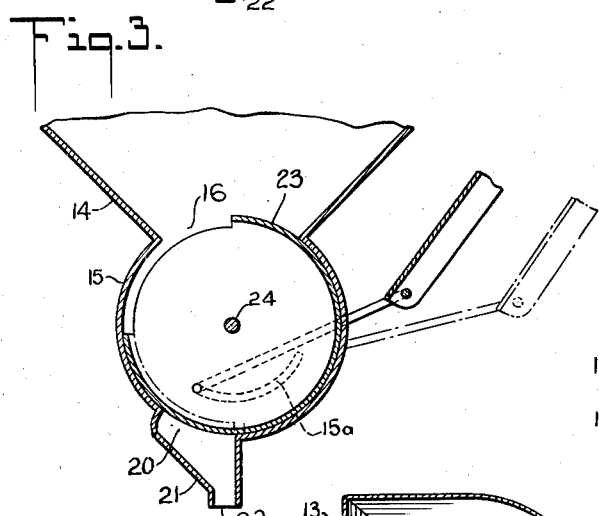
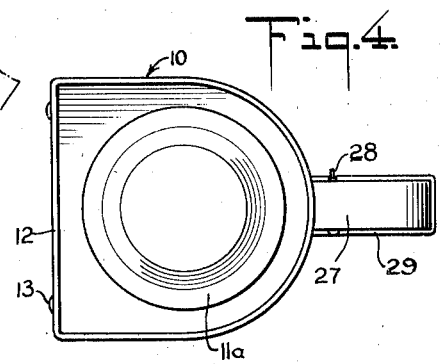
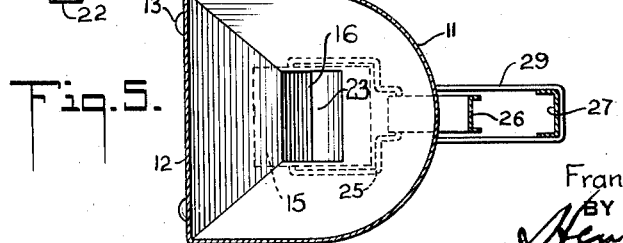
INVENTOR
Francis J. DeJavannes
BY
HIS ATTORNEY Patented May 9, 1939

2,157,282

UNITED STATES PATENT OFFICE 2,157,282

DISPENSER

Francis J. de Javannes, New York, N. Y.

Application January 26, 1938, Serial No. 186,927

1 Claim. (Cl. 221—106)

This invention relates to dispensers for coffee and the like.

Particularly, the invention relates to means for dispensing a measured quantity of coffee or like foodstuff from a chamber in which the foodstuff is maintained substantially protected from atmospheric influences, thus maintaining the "freshness" of the foodstuff.

Pursuant to my invention, the bulk of such foodstuff is contained within the major body of the dispenser, and maintained at all times substantially sealed from the outer atmosphere. Preferred embodiments of my invention are provided with dispensing means which serve to accurately measure the quantity dispensed, such provision insuring uniformity of the ultimate beverage or food product.

The general structure of embodiments of my invention comprises the combination of a hollow container body serving as the major portion of the dispenser, in which the ground coffee, for example, is placed in bulk, and dispensing means communicating with the interior of such hollow container body, such dispensing means providing for the withdrawal of a measured amount under conditions which substantially prevent access of the outer atmosphere to the bulk of the coffee. Advantageously, such dispensing means embodies a cylindrically formed housing, provided at a certain portion of its periphery with a discharge passage of predetermined arcuate area, a cylindrical measuring cup being rotatably mounted within said housing and arranged to dispense its contents through said discharge passage upon suitable rotation of the measuring cup while preventing additional flow of coffee into the measuring cup or through such discharge passage. Further, there may be provided a handle proper for the dispenser and a trip element associated with the handle for actuating the dispensing means to dispensing position, such trip element being associated with the handle proper and serving combinedly to be grasped by the user. Resilient bias spring means tend to hold the measuring device in non-dispensing position and serve to return the stated measuring cup again to filling position after the discharge of its original contents through the discharge passage. Desirably, such spring requires definite physical effort to move the dispensing means to dispensing position.

In preferred embodiments of my invention, the container and dispensing means are unitarily combined, the dispensing means thereby being in effect an integral continuation of the container. Such arrangement provides for advantageous positioning and organization of the handle proper and its therewith associated trip element. However, the dispensing means may be an independent unit, suitably arranged for attachment to a conventional coffee can, "Mason" jar, or other conventional container.

Further features and objects of the invention will be more fully understood from the following detail description and the accompanying drawing, in which:—

Fig. 1 is a side elevation of a preferred embodiment of my invention;

Fig. 2 is a front elevation of Fig. 1;

Fig. 3 is a detail vertical sectional view on line 3—3 of Fig. 2, showing diagrammatically the movement of the trip element and corresponding movement of the dispensing means from non-dispensing position to dispensing position;

Fig. 4 is a top plan view of Fig. 1; and

Fig. 5 is a detail vertical sectional view on line 5—5 of Fig. 1.

Referring to Figures 1 and 2, the dispenser 10 includes a container 11, which may be fabricated from sheet metal or the like, and provided at its upper end with a preferably screw-sealing cap 11a by means of which the container may be filled with "ground", i. e., granulated, coffee or the like. The lower portion of the container 11 preferably communicates directly with a hopper 14, such hopper advantageously being structurally united to the lower extremity of the container, and kept filled by gravitational flow from the container 11.

The container 11 may have one flat side wall, as 12, Fig. 4, on which it may be set when not in use. Suitable feet, as 13, may be provided. It is, of course, within the scope of the present invention to provide the side wall 12 with brackets or other suitable mounting means whereby the container may be supported on a suitable wall.

To effect the withdrawal of a definite, measured amount of coffee or the like from the container 11, there is provided at the lower end of the hopper 14 a novel dispensing and measuring device, arranged to normally seal the interior of the dispenser against the admission of air except during the brief interval of actuation of the dispenser to discharge a specified amount of coffee. Such dispenser may include a substantially cylindrical outer structure 15, in effect a continuation of the hopper 14, and having an opening 16 communicating directly therewith. Preferably at a location substantially diametrically opposite the stated communicating opening, a passage 20 of a chute 21 fixed to the structure 15 terminates in an open spout 22. A drum 23, of predetermined volumetric capacity, is arranged for rotation within chamber 15 about a pivot 24 secured to the side walls of the chamber 15, the stated drum being of suitable dimension to permit a slidable but close contact with the inner walls of the structure 15. The drum 23 may have substantially a quadrant of its peripheral wall and end walls removed, but preferably, as indicated in Fig. 3, such opening may include the peripheral wall only. The drum 23 is arranged to be maintained in normal, i. e., non-dispensing position, as in Fig. 3, in which a portion of the opening of the drum communicates directly with the hopper 14. Thus, the drum is maintained full of the ground coffee or the like by flow from the hopper 14. The dimensions of the drum and of the outer housing 15 are established to accommodate a predetermined volume of the coffee or like foodstuff contained within the chamber 11.

As is well known, certain foodstuffs, such as coffee, lose their "freshness" when exposed to the atmosphere. It is a feature of the present invention, as indicated in Fig. 3, that the passage 20 and its therewith associated structure is completely closed by a solid-wall portion of the drum 23, and thus, the contents of the can are maintained substantially sealed against the inflow of atmosphere thereto.

To effect the withdrawal of the definite amount of coffee or the like contained in the drum 23, means are provided to rotate the drum into its dispensing position, in which the opening thereof will be brought into register with the passage 20 of the spout means 21. Such rotation of the drum 23 simultaneously prevents outflow of coffee from the hopper 14, by bringing the solid peripheral wall portion of the drum into closing engagement with the lower opening of the hopper. Desirably, flow from the hopper 14 is stopped prior to any degree of registry of the opening of the drum with the passage 20. Suitable proportion of the passage 20 provides for the complete closing of such opening, upon return of the drum 23 to "normal" position, prior to any degree of registry of the opening in the drum with the lower opening of the hopper 14.

The rotation of the drum 23 required to completely empty it of its contents by gravitational flow thereof through the spout 22 may be effected by a handle or crank, suitably arranged to act upon the drum and impart movement thereto. In a preferred embodiment of the invention, such rotation is obtained by a link 25 having inwardly turned extremities hooked into suitable holes provided in the end-walls of the drum 23, and operatively associated with a lever 26 pivoted, as by the pin 28, to an upper member of a handle structure 27. A rotation of the lever 26 counterclockwise of Fig. 1 therefore is effective to cause a suitable rotation of drum 23. As shown in Figs. 1 and 3, access of the link extremities to the walls of the drum 23 is afforded by suitable arcuate slots 15a cut through the side walls of the housing 15. Such slots serve to limit the rotation of the drum.

Desirably, the structure 27, forming the handle per se of the dispenser, such handle structure including a lower member 29, straddles the actuating lever 26. Advantageously, the lever 26 and a portion of the handle structure are channel-shaped, as shown in Fig. 5, to provide for the housing of a leaf spring 30 or equivalent, such spring bearing against an inner wall of the handle 27 and of the lever 26 respectively, and serving to urge the lever 26 constantly into rotation clockwise of Fig. 1. The stated spring should be of sufficient strength to return the drum 23 to its spout-sealing and coffee-receiving position against any resistance interposed by the granulated coffee or similar material in the container. Further, the spring should be of sufficient strength to require a definite physical effort to rotate the drum 23 into its dispensing position and to resist casual pressure incident to grasping the handle and lever when picking the filled dispenser up and bringing it into operative, i. e., vertical, position.

As will be obvious, a portion of the charge of coffee or the like poured into the container 11 flows immediately into the drum 23, filling it to a definite level. When it is desired to withdraw material from the dispenser, the lever 26 is rotated counterclockwise of Fig. 1 through the act of gripping the handle 27 and lever 26 "squeezing" the lever against the handle. Such motion of the lever 26 causes an appropriate rotation of the drum 23, swinging the closed wall portion thereof into closing relationship with the lower terminus of the hopper 14, while subsequently bringing the open wall portion of the drum into communication with the spout means 21. The contents of the drum completely empty by gravitational flow through and out of the spout 22. Upon release of pressure on the lever 26, the spring 30 urges the drum into movement effecting a rotation of drum 23, and swinging a solid wall portion of the drum into closing relationship to the passage 20 and returning the open-wall portion of the drum into alignment with the hopper 14, whence it is again filled. The dispensing means may be actuated as many times as is required to withdraw the total required amount from the container, each individual withdrawal being of a definite quantity.

Whereas I have described my invention by reference to specific forms thereof, it will be understood that many changes and modifications may be made without departing from the spirit of the invention.

I claim:

A portable dispenser for coffee or like granular material, comprising a container for storing said material, a wall of said container being arranged to support said dispenser when not in use, a closed ended substantially cylindrical housing secured to said container at an end thereof and having an opening communicating with said container, a cylindrical measuring drum rotatably mounted within said housing, said drum being in close slidable contact with the inner surfaces thereof, said cylindrical measuring drum having closed end-portions and a peripheral wall provided with an opening, said opening arranged to communicate with said container to afford passage of stored material from said container into said measuring drum, a discharge spout operatively associated with said housing and having an opening communicating therewith, said opening being closed by said peripheral measuring drum wall in any circumstance of communication of said measuring drum wall opening with said container, handle means secured to said container, and means associated with said handle means and arranged to be grasped concurrently therewith for rotating said measuring drum to effect passage of the contents thereof into said discharge spout, said means comprising a spring biased lever pivotally associated with said handle means and a link pivotally interconnecting an end of said lever and an end wall of said measuring drum, the wall of said housing adjacent said measuring drum end wall having an arcuate slot arranged for the securement of said link to said drum wall, while restricting the degree of rotation of said measuring drum.

FRANCIS J. DE JAVANNES.